(12) United States Patent
Bahai

(10) Patent No.: US 7,016,695 B1
(45) Date of Patent: Mar. 21, 2006

(54) APPARATUS AND METHOD FOR PROCESSING A DETERMINISTIC DATA FLOW ASSOCIATED WITH A WIRELESS COMMUNICATION SIGNAL

(75) Inventor: Ahmad Bahai, Lafayette, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 489 days.

(21) Appl. No.: 10/318,346

(22) Filed: Dec. 11, 2002

(51) Int. Cl.
    *H04Q 7/20* (2006.01)
(52) U.S. Cl. .......................... 455/466; 455/418; 455/84
(58) Field of Classification Search ................ 455/418, 455/453, 19, 20, 21, 23, 84, 466, 436; 375/219, 375/220, 222
    See application file for complete search history.

(56) References Cited

U.S. PATENT DOCUMENTS

| | | | |
|---|---|---|---|
| 4,439,839 A | 3/1984 | Kneib et al. | |
| 4,641,238 A | 2/1987 | Kneib | 364/200 |
| 4,837,678 A | 6/1989 | Culler et al. | 364/200 |
| 5,237,673 A | 8/1993 | Orbits et al. | |
| 5,479,453 A | 12/1995 | Anvari et al. | |
| 5,577,250 A | 11/1996 | Anderson et al. | 395/670 |
| 5,623,684 A | 4/1997 | El-Ghoroury et al. | 395/800 |
| 5,802,153 A * | 9/1998 | Sridhar et al. | 375/220 |
| 5,854,904 A | 12/1998 | Brown | 395/280 |
| 5,867,400 A | 2/1999 | El-Ghoroury et al. | 364/490 |
| 5,901,301 A | 5/1999 | Matsuo et al. | 395/388 |
| 6,067,295 A | 5/2000 | Bahai et al. | |
| 6,097,770 A | 8/2000 | Bahai et al. | |
| 6,189,033 B1 * | 2/2001 | Jin et al. | 709/225 |
| 6,275,525 B1 | 8/2001 | Bahai et al. | |
| 6,446,193 B1 | 9/2002 | Alidina et al. | |
| 6,453,407 B1 | 9/2002 | Lavi et al. | 712/24 |
| 6,560,196 B1 * | 5/2003 | Wei | 370/230.1 |
| 6,690,936 B1 * | 2/2004 | Lundh | 455/436 |
| 2002/0015438 A1 * | 2/2002 | Ishizu et al. | 375/147 |
| 2002/0151298 A1 * | 10/2002 | Muhonen | 455/418 |

OTHER PUBLICATIONS

Hennessy and Patterson, Computer Architecture—A Quantitative Approach, 2nd Edition, 1996, pp. 87-88.
Stiller et al., A Flexible Middleware for Multimedia Communication: Design, Implementation, and Experience:, IEEE JSAC Special Issue on Middleware, vol. 17, No. 9, pp. 1614-1631, 1999.
Khoo et al., U.S. Appl. No. 09/458,131, filed Dec. 9, 1999.
Ma et al., U.S. Appl. No. 09/348,783, filed Jul. 7, 1999.

* cited by examiner

*Primary Examiner*—Joseph Feild
*Assistant Examiner*—Huy Nguyen
(74) *Attorney, Agent, or Firm*—Darby & Darby PC; John W. Branch

(57) ABSTRACT

The invention is directed to an apparatus, method and system for providing reduced power consumption, fast processing of digitized communication signals and relatively easy reconfiguration for different applications, such as communication protocols/standards. The invention recognizes that the processing of signals associated with different types of communication standards can be recharacterized as deterministic data flows. Also, for each deterministic data flow, several of the same categories of computation are performed in substantially the same manner, albeit in a different order or somewhat differently, that is unique to a particular application. Based on this recharacterization, the invention divides the processing of the deterministic data flow for a communication signal among several Class processors that are separately configurable to optimize their particular category/class of computation in the processing of the signal.

31 Claims, 15 Drawing Sheets

CLASS PROCESSOR

Fig. 6   CSP PLATFORM

APPARATUS AND METHOD FOR PROCESSING A DETERMINISTIC DATA FLOW ASSOCIATED WITH A WIRELESS COMMUNICATION SIGNAL

FIELD OF THE INVENTION

The present invention is directed to signal processors, and more particularly, employing multiple signal processors to process a deterministic data flow associated with a signal.

BACKGROUND OF THE INVENTION

In recent years, several high-speed data services have become standardized for wireless communication. Also, many of these standardized services employ relatively complex computational techniques to process wireless communication signals. However, this kind of signal processing demand creates significant implementation issues for affordable, lightweight and conveniently sized mobile (wireless) nodes. Also, these signal processing demands can cause bottlenecks in implementing mobile nodes capable of multi-mode, multi-band operation and reduced power consumption.

Some devices employ a custom designed Application Specific Integrated Circuit (ASIC) to perform digital signal processing of communication signals. Other devices use a single and relatively generic digital signal processor (DSP) to process communication signals. And still other devices employ a hybrid design that includes both ASICs and generic DSPs to process communication signals.

There are benefits and trade-offs when employing either an ASIC or generic DSP to digitally process communication signals. For example, although the "hard wiring" of an ASIC consumes substantially less power than a DSP, an ASIC is not easily reconfigurable for multiple modes of operation. On the other hand, although reprogramming or reconfiguring of a generic DSP can be relatively easy, it will tend to consume more power than an ASIC performing substantially the same operations. Also, although the per unit cost of a generic DSP is substantially more expensive than an ASIC, the up front costs to custom design the hard wiring of an ASIC can be substantial and difficult to recoup when a relatively small number of ASICs are needed.

Additionally, System on a Chip (SoC) concepts have been tried for digital signal processing of communication signals. However, owing to the complexity of many communication standards, the highly integrated silicon technology of SoC implementations have not yet been sufficiently compelling to provide an alternative to ASIC, generic DSP and hybrid designs for communication systems. In particular, a typical SoC circuit can only be clocked so fast and still be efficient (not consume as much or more power than a generic DSP based communication system).

In recognition that wireless communication data flows are deterministic and data-centric, it would be preferable to employ this understanding in digital processing of communication signals. Also, by taking a top-level communication system viewpoint and making architectural decisions that best fit the data-flow model of an application, such as a wireless communication standard, it may be possible to address many of the issues that inhibit optimal communication system implementations, e.g., high speed, low cost, and low power.

DETAILED DESCRIPTION OF THE PREFERRED EMBODIMENT

Figure 1A:
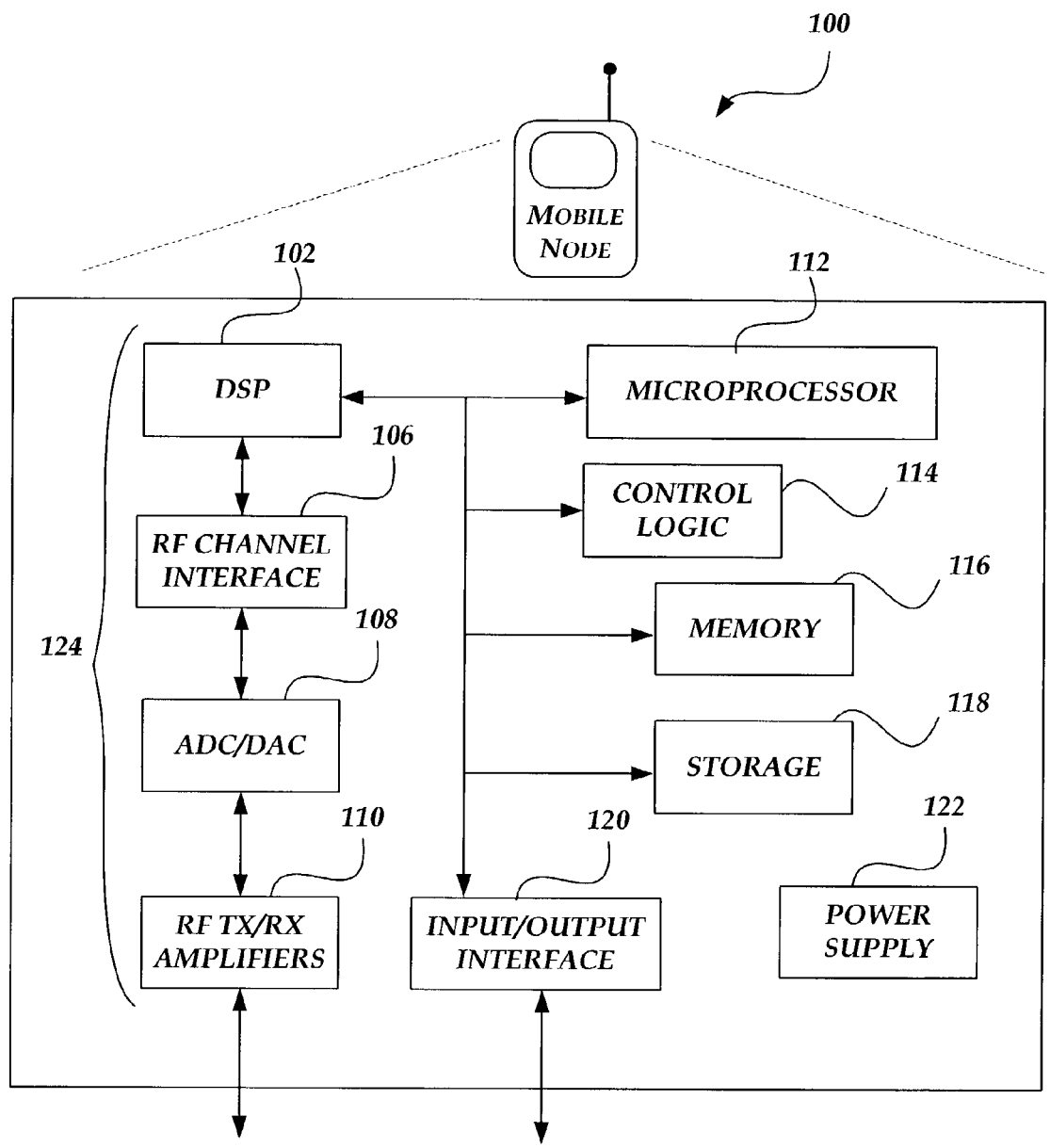
FIG. 1A illustrates a schematic diagram of at least some of the components included in an exemplary mobile node.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The terms "comprising," "including," "containing," "having," and "characterized by," mean an open-ended or inclusive transitional construct and does not exclude additional, unrecited elements, or method steps. For example, a combination that comprises A and B elements, also reads on a combination of A, B, and C elements.

The term mobile node means a wireless device, e.g., a cellular telephone, pager, Personal Digital Assistant, host or router that is capable of changing its point of attachment from one wireless network or subnetwork to another. A mobile node may change its location without changing its IP address; and it may continue to communicate with other nodes coupled to the Internet at any location using its (constant) IP address, assuming link-layer connectivity to a point of attachment is available.

The term Digital Signal Processor (DSP) means a type of co-processor that is generically designed to perform high speed calculations on analog information presented in a digital format, such as audio, pictures, communication and video signals. Also, a DSP is usually employed in the compression and decompression of the digitally formatted information.

The term Class processor means a DSP with a core that is configurable to perform optimized algorithms associated with a particular category/class of computation for an application, e.g., a wireless communication standard such as. For example, a Class processor might be configured to perform compression algorithms such as discrete cosine transforms (DCT) and/or fast fourier transforms (FFT) methods on digitized Global System for Mobile communication (GSM) communication signals. Also, multiple Class processors can be included in a common CSP platform to process different categories of computations for several different types of applications.

The term Communication Signal Processor (CSP) means a processor or platform that can include several Class processors that are arranged to process different classes of computations on deterministic data flows, e.g., data flows that are typical for wireless communication standards. Additionally, the CSP may be included in a platform for System on a Chip (SoC) integration of various components employed by a communication system, such as a mobile node.

The invention is directed to an apparatus, method and system for providing reduced power consumption, fast processing of digitized communication signals and relatively easy reconfiguration for different applications, such as communication protocols/standards. The invention recognizes that the processing of signals associated with different types of communication standards can be recharacterized as deterministic data flows. Also, for each deterministic data flow, several of the same categories of computation are performed in substantially the same manner, albeit in a different order or somewhat differently, that is unique to a particular application. Based on this recharacterization, the invention divides the processing of the deterministic data flow for a communication signal among several Class processors that are separately configurable to optimize their particular category/class of computation in the processing of the signal.

A main clock signal can be employed to synchronize the deterministic data flow of the signal between each Class Processor included with the invention. However, each Class Processor can use a different clock signal and/or different voltage level to asynchronously perform their particular class of computation. A higher, same or lower clock signal and/or voltage level can be selected for each Class Processor to optimize their particular class of computation and reduce wait states in the processing of the signal. Also, the optimized clock signal and voltage level for each Class Processor reduces the overall power consumption of the invention.

Additionally, since operation of each Class Processor is separately reconfigurable, the CSP can be changed to accommodate different types of applications, such as wireless communication standards without having to undergo a relatively expensive redesign. For example, a CSP included with a mobile device could be initially configured to operate in a GSM based network and later reconfigured to process wireless communication signals in another network, e.g., CDMA (Code Division Multiple Access). Although the initial configuration of the operation of Class Processors included with the CSP could be performed during manufacturing, later reconfigurations could be selected or performed automatically by detecting the type of application associated with a currently received signal.

Operating Environment

FIG. 1 illustrates a schematic diagram of at least some of the components employed with exemplary mobile node 100. Transmission and reception of wireless communication signals are sequentially processed by a group of components 124 that include Radio Frequency Transmission and Reception Amplifiers 110, Analog to Digital and Digital to Analog converters 108, Radio Frequency Channel Interface 106 and DSP 102. Amplifiers 110 receive and transmit analog wireless communication signals between mobile node 100 and other nodes (not shown), e.g., mobile nodes and base stations. Converters 108 provide digitization of received wireless communication analog signals and conversion of digital signals into wireless communication analog signals for transmission. Also, RF channel interface 106 provides determination of the channel associated with received and transmitted wireless communication signals. Additionally, DSP 102 performs the relatively complex mathematical processing of digitized wireless communication signals in accordance with the particular wireless communication standard that is associated with the signal.

Microprocessor 112 is coupled to several components, including, but not limited to, DSP 102, control logic 114, memory 116, storage device 118, and input/output interface 120. Microprocessor 112 is in communication with at least several of the mobile node's components and enables the operation of mobile node 100 by a user. Control logic 114 may include an ASIC, discrete logic components, and the like. Memory 116 may include Read Only Memory (ROM), Random Access Memory (RAM), removable memory media, and the like. Storage device 118 may include a hard disk, removable storage media, and the like. Also, Interface 120 may enable the operation of a keypad, command button, control, pointing device, display, and speaker. Additionally, power supply 122 is configured to provide electrical energy to almost all of the components included with mobile node 100. Although not shown, a clock provides a signal that is employed to control the operation of at least some of the components included with mobile node 100.

Figure 1B:
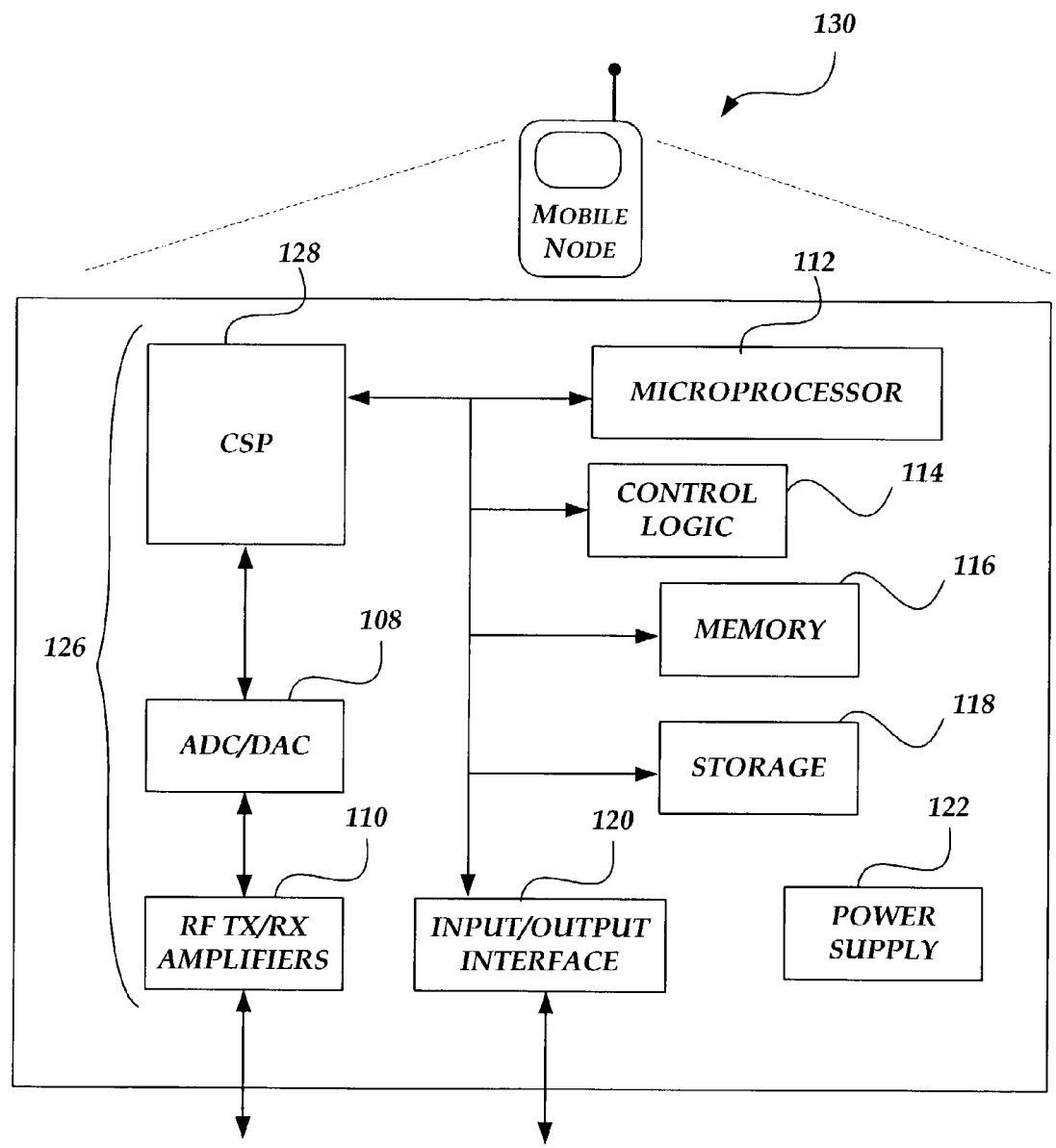
FIG. 1B shows a schematic diagram of a mobile node that includes a communication signal processor and at least some of the components included in an exemplary mobile node.

FIG. 1B illustrates another exemplary mobile node 130 whose operation is substantially similar to the mobile node shown in FIG. 1A, albeit different in other ways. Transmission and reception of wireless communication signals are sequentially processed by a group of components 126 that includes CSP 128, converters 108 and amplifiers 110. In mobile node 130, CSP 128 combines the operation of two components discussed and illustrated in FIG. 1A, i.e., DSP 102 and interface 106. Also, CSP 128 is in communication with at least microprocessor 112 for the processing of digitized wireless communication signals in accordance with a wireless communication standard, such as GSM, Enhanced Data GSM Environment (EDGE), CDMA, Wideband CDMA (WCDMA), CDMA 2000, Wireless Fidelity (WIFI, IEEE 802.11xx), integrated Digital Enhanced Network (iDEN), General Packet Radio Service (GPRS), Bluetooth, and the like.

Figure 1C:
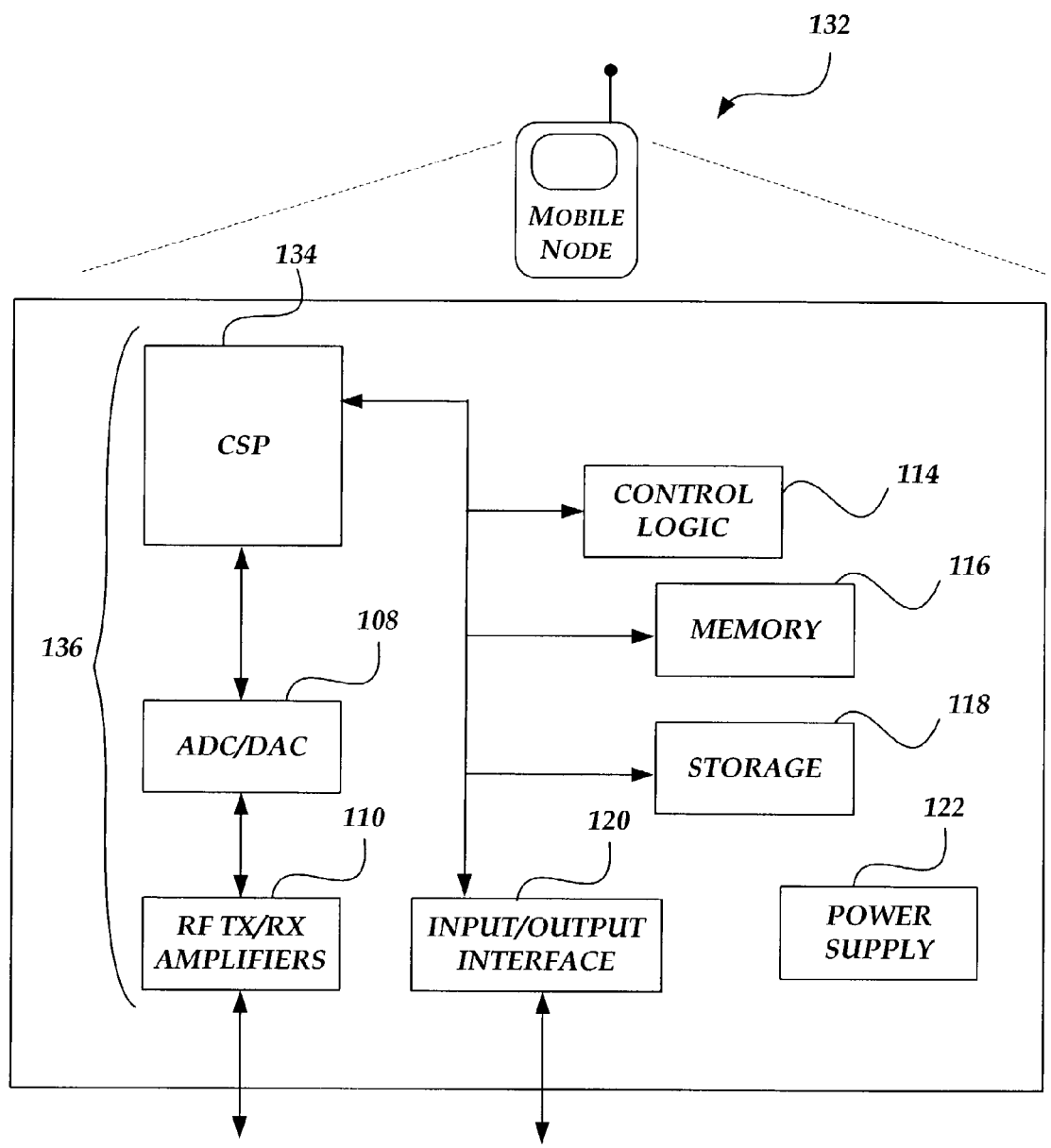
FIG. 1C illustrates a schematic diagram of a mobile node that includes a communication signal processor and at least some of the components included in an exemplary mobile node.

FIG. 1C illustrates another exemplary mobile node 132 whose operation is substantially similar to the mobile node shown in FIGS. 1A and 1B, albeit different in other ways. Transmission and reception of wireless communication signals are sequentially processed by a group of components 136 that includes CSP 134, converters 108 and amplifiers 110. In mobile node 130, CSP 134 combines the operation of three components discussed and illustrated in FIG. 1A, i.e., a DSP, microprocessor and interface. CSP 134 processes digitized wireless communication signals in accordance with a wireless communication standard and enables the operation of mobile device 132. Additionally, although not shown in FIGS. 1B and 1C, the CSP can also be provided in a System on a Chip (SoC) platform that performs the operation of any one of or substantially all of the other listed components.

Figure 2:
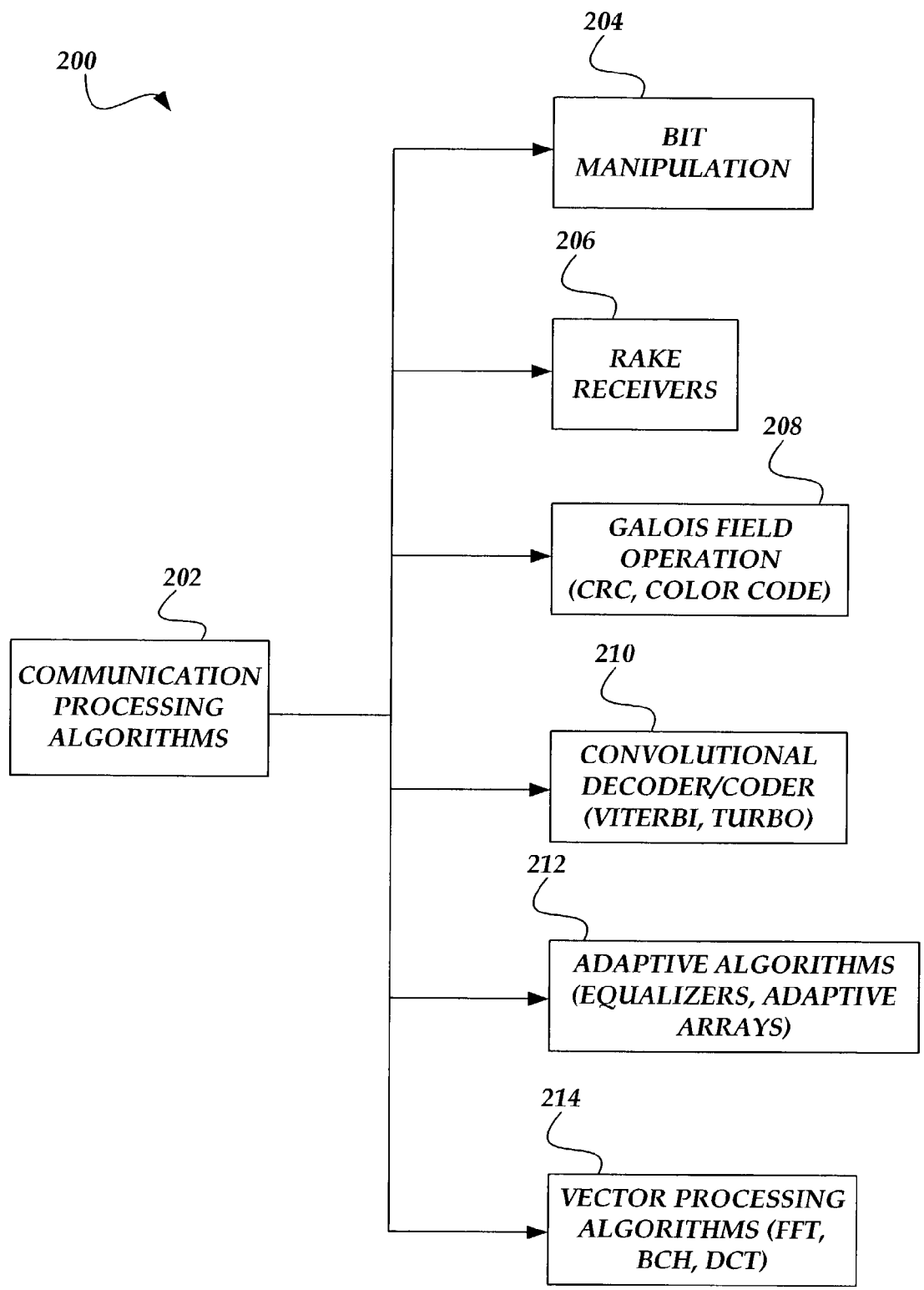
FIG. 2 shows a functional block diagram of at least some of the classes of methods that are employed for processing wireless communication signals.

FIG. 2 illustrates an overview 200 of six different categories or classes of the computational algorithms that are typically performed in the processing of most signals associated with a wireless communication standard. As shown, communication processing algorithms 202 may include separate classes for bit manipulation 204, RAKE receivers 206, galois field operations 208 for performing operations such as CRC, color code, and the like, convolutional decoders/encoders 210 for performing operations such as Viterbi, Turbo and the like, adaptive algorithms 212 for enabling the operation of equalizers, adaptive arrays and the like, and vector processing 214 for performing operations such as such as FFT, DCT, Bose-Chaudhuri-Hochquenghem (BCH) code, and the like. This listing of different categories/lasses of communication processing algorithms is not intended to be exhaustive, but rather show how these algorithms can be grouped.

Processor Architecture

Figure 3A:
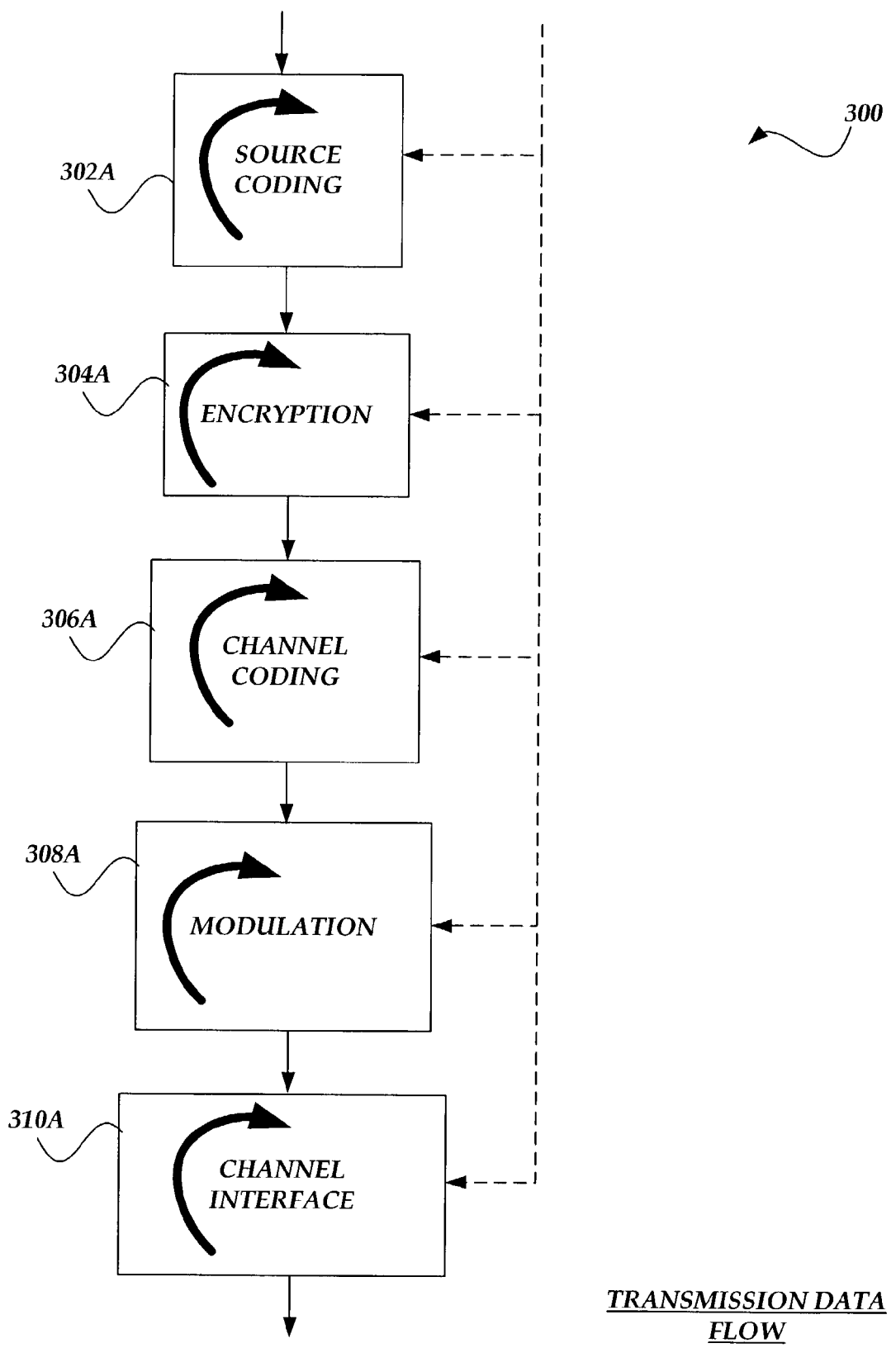
FIG. 3A illustrates a functional block diagram of the operation of different classes of processing and deterministic data flow for the transmission of wireless communication signals.
Figure 3B:
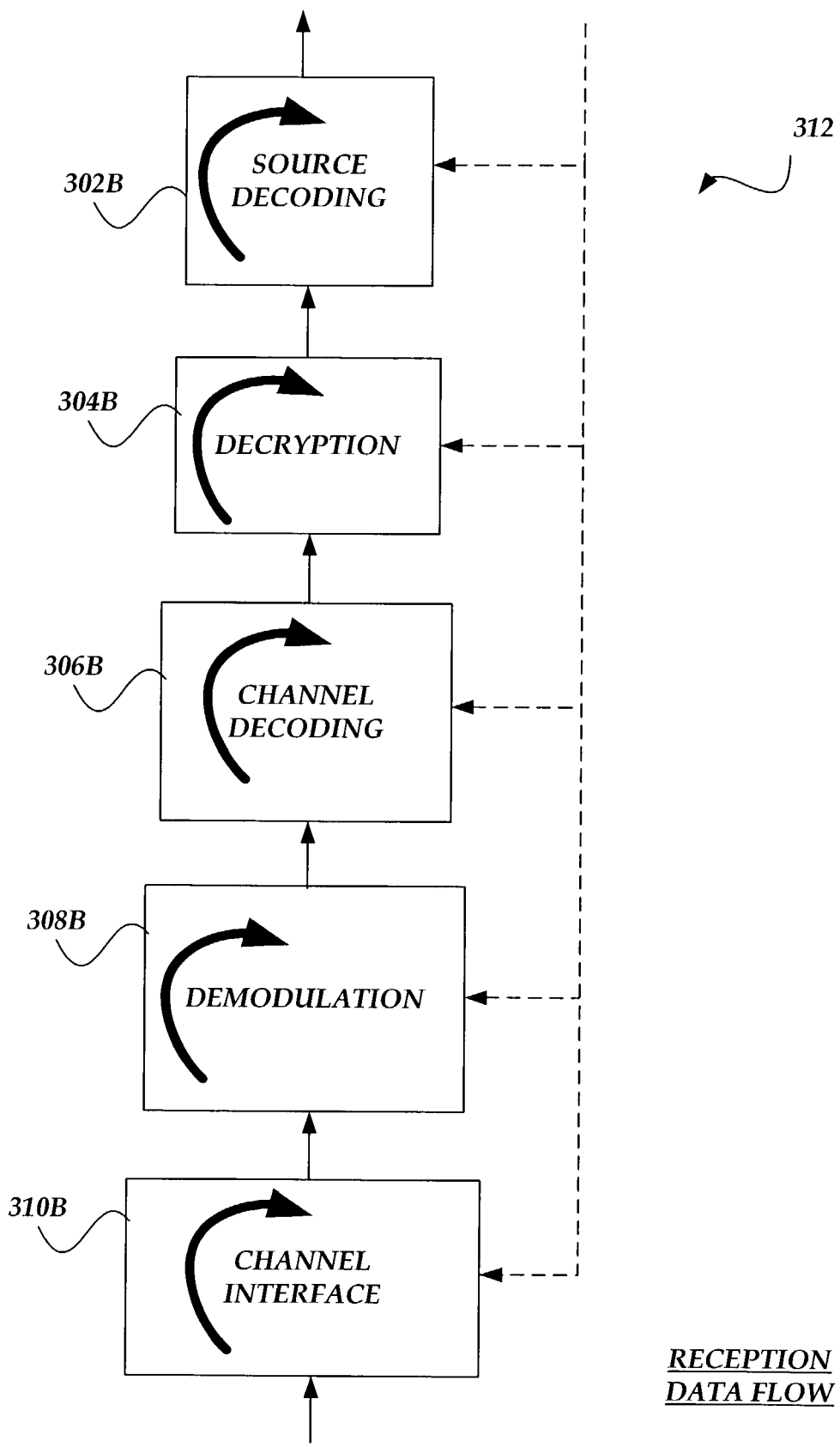
FIG. 3B shows a functional block diagram of the operation of different classes of processing and deterministic data flow for the reception of wireless communication signals.

An object oriented System on a Chip (SoC) architecture for a CSP based platform can localize high-speed data flow in communication signal processing systems to achieve low power and easy integration. Typically, a communication system handles two deterministic data flows: transmission and reception flows, as shown in FIGS. 3A and 3B. This aspect of communication systems is a relatively unique feature when compared to many other systems where fully random data flow is considered, such as in a personal computer or Personal Data Assistant where a large number of applications are often supported that can significantly diversify the data flow model.

Advanced communication systems have increasingly adopted more advanced, complex and diversified algorithms for processing signals, such as Turbo decoders, time-frequency diversity, various adaptive algorithms and multi-scheme systems. However, these advanced communication systems still maintain relatively consistent data flow patterns, which are well suited to make a domain specific architecture, i.e. limit the architecture to a relatively fixed and optimized data flow pattern. Currently, other architectures are more often based on a random data flow approach that provides flexibility, but at the cost of higher power consumption due in part to excessive data transitions and clock speed headroom.

On-chip communication flow for communication systems can be divided into three data flow speed groups, as shown in FIGS. 3A and 3B. For the high-speed data flow, which can be hundreds of Mbps, the data movement can be generated by signal processing functions, such as filtering and transforms. The medium-speed data flow, which can be a couple of Mbps, typically carries processed signals/information from one subsystem to another in sequential order. The low-speed data flow typically operates at tens of kbps and can pass control information from the host control, which can be protocol stack processors or application processors, and the like. If all three data flows were to pass on the same bus, which is what most other SoC designs have assumed in the past, many conflicts can happen, hence a high clock rate is typically required that results in even higher power consumption.

Another consideration in providing a low-power and high-speed communication system is to use more memory as a trade-off for interconnections. However, a shared memory architecture may not be as effective as interconnections because the unit cost of transistors is decreasing and the cost of metal interconnections is becoming relatively more expensive. Thus, separating high-speed data operations from low speed data operations with different memory banks can further reduce overall power consumption. Also, the power consumption can also be lowered by locating relatively high speed memory banks close to a high speed processor core.

The invention employs an object-oriented architecture to divide a communication system into objects, which are connected by data flows. Each object can contain a particular category/class of high-speed data flows within the object. Each object can be implemented at least in part with fixed logic (hardwired object) and/or relatively small DSP cores in Class Processors. An object uses a Class Processor core as a software object and its functions can be implemented in firmware that can be changed relatively easily for a variety of different algorithms, different communication standards, and the like. Each class processor can handle a category/family of algorithms, but still share almost the same programming environment.

Figure 4:
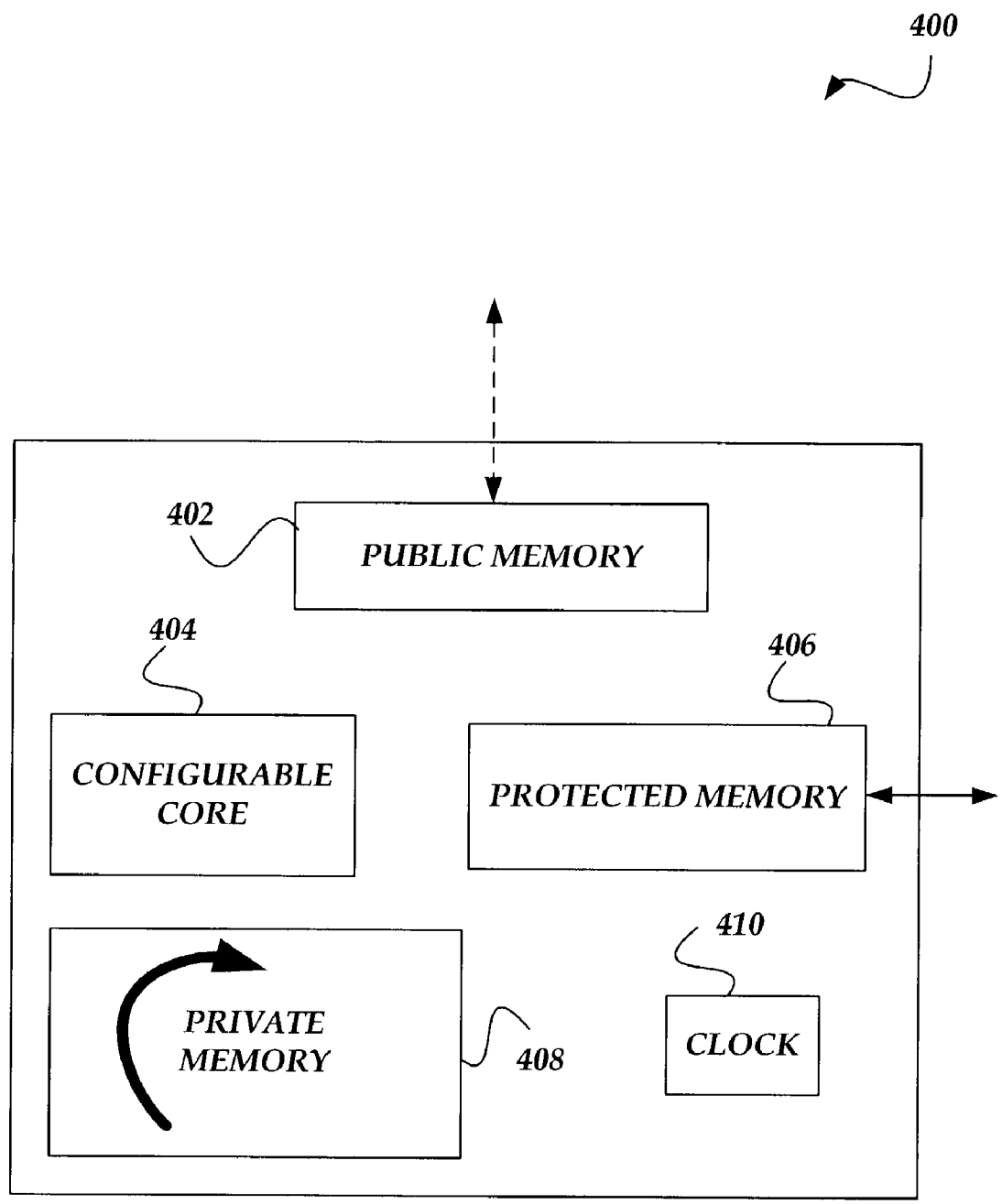
FIG. 4 illustrates a functional block diagram of at least some of the components included in a class DSP.

A class processor typically includes a configurable core with at least three types of memory, as shown in FIG. 4. Private memory is used to handle local high speed processing data flow. Protected memory is used for peer-to-peer flow of data between Class Processors, and public memory is employed to communicate with the host processor for control operations.

As discussed above, an object-oriented architecture for a CSP platform has several advantages. First, integration is relatively easy since the CSP platform can employ relatively loose coupling for integration. The CSP platform does not necessarily depend on a particular bus architecture, instead it can employ dedicated connections for individual high speed data flow and host native communication infrastructure for control data flow, which is at very low speed. The CSP platform is hostless, which can support any host chosen by a user of the communication system.

Another benefit of the invention is relatively easy programming. All of the Class Processors can employ relatively the same configurable core so that they are able to maintain substantially the same programming environment. Since the CSP platform leverages a relatively fixed inter-core communication network and is coupled very loosely, programming is relatively easier than configuring interconnections or a parallel computing approach.

Yet another benefit of the invention is lower power consumption. Since the CSP platform separates and contains the high speed processing data flow from others data flows, it has the ability to reduce the power consumption associated with interconnections. Also, it can perform better than a uniprocessor approach that employs multiple distributed sequencers and data flows to avoid a high clock rate due to conflicting tasks running in the same sequencer. The CSP platform also reduces the use of ASICs in a communication system by using more memory and class processors, which in turn enables more advanced processes to be used in fabrication.

Still another benefit of the invention is its flexibility. Since system functions can be implemented in firmware, useful applications such as a software-defined radio can be implemented with a CSP platform that employs highly optimized class processors to perform the wireless communication algorithms. Other software radio advantages include changing and upgrading algorithms, and correcting hardware errors.

Another benefit of the invention is its fast time-to-market. The CSP platform separates the SoC design into two activities: class processor design and firmware design. The class processor can be performed in parallel with system analysis, as it doesn't contain too much system knowledge. Also, the algorithm complexity can be carried by firmware.

As SoC designs become more complex, two issues, which are very closely linked to architecture selection, emerge at least as important as computational throughput. These two issues are firmware and tools. Since SoC designs are adopting more and more firmware to replace hardwired circuits, great effort is expended in creating efficient firmware, especially deep embedded firmware. Firmware can also be called embedded software and it often has at least two major sections. The first section is up-embedded software, which can include applications, Real Time Operating System (RTOS), protocols, and the like. The second section is deep embedded software (DES), which can include DSP assembly code, micro-code for a configurable core or Field Programmable Gate Array (FPGA), and the like.

Up embedded software is typically characterized as a software despite the fact that it typically resides on the chip. In contrast, the DES occupies more of the boundary between software and hardware, which is tightly linked to hardware architecture. Also, the DES is often numerical, MIPS intensive, difficult to develop, and optimize. However, the DES greatly affects and often determines the overall performance of the communication system and power consumption although its code size is not relatively large.

One method for developing firmware is to use a high-level language like C/C++. This method works well for up embedded software, but is not as successful with DES or DSP firmware. Often, assembly language programming is employed, because much better performance can be achieved. Also, when large numbers of configurable cores are deployed in a SoC design, there is an increase in the difficulty to create an easily programmable interface. Additionally, if a high level language is employed, the overhead introduced by its compiler may diminish many of the advantages achieved by the use of configurable cores.

Currently, many of the other DSP architectures present too complicated a programming model to be used with an assembly language. One approach for programming firmware is to employ a high-level language environment that is supported by an assembly language library and intrinsic functions. This approach can be adequate for certain applications, but not for very advanced algorithms since they typically haven't been covered in the libraries. Also, since the CSP platform employs a number of small and simple class DSP cores in the SoC chip, all of the cores can be relatively easily programmed in assembly language. However, a multi-layered code authoring and verification method can be used to upgrade an assembler environment to the C program language level, while still maintaining substantially the same performance as assembly language programming.

A SoC tool also plays a role in creating and verifying communication systems that may have multiple cores. Currently DSP tools are mostly point tools, which support a relatively standalone uniprocessor or core. Thus, when an entire SoC communication system is integrated into one chip and running in real-time, providing visibility, bug fixes, system parameter tuning, and algorithm adaptation verification is challenging. Typically, the SoC tool is configured to provide at least some support for heterogeneous and homogeneous multiple-core tools, which are employed in product development and marketing. Thus, when the entire communication system is integrated into a single device, the evaluation board hardware may not be difficult to make, but it may not demonstrate sufficient functionality for the SoC. Thus, sophisticated software tools that can view the internal workings of the SoC are a factor in acquiring customers.

FIG. 3A is a functional block diagram illustrating an overview 300 of the processing of the data flow for digitized communication signals by different class processors. In response to the operation of a mobile node, a digitized signal is received from a host processor (not shown) for source coding at block 302A by a class processor. Once the computation is completed at block 302A, the processed signal is moved to the next class processor at block 304A where encryption computations are performed by a different class processor. Similarly, the processed signal is moved from block 304A to block 306A for channel coding, from block 306A to block 308A for modulation, and from block 308A to block 310A for channel interface processing by different class processors. Next, the processed digitized signal is provided to a digital to analog converter and an amplifier (not shown) for transmission of an analog communication signal.

As indicated by the thick curved arrow in each block, computationally intensive processing is performed within the class processor. In contrast, relatively slow operations such as moving the processed data between class processors (indicated by relatively light arrows between each block) and controlling the operation of each class processor (indicated by the dotted arrows) is handled separately.

In operation, each class processor can be configured with a different voltage level and/or clock signal that enables an optimal processing of the wireless communication signal and the data flow between class processors. Also, the bus for moving the processed signal between class processors and the control of the class processors can employ different clock signals and voltages that are optimally suited for their particular function. By selecting a clock signal to reduce wait states and a voltage level to conserve energy, the operation of each class processor, bus and control system in the CSP can be optimized for both high speed operation and relatively low power consumption.

FIG. 3B is a functional block diagram illustrating an overview 312 of the processing of the data flow for received communication signals by different class processors. The operation of the class processors in FIG. 3B is substantially similar to the reverse operation of the class processors shown in FIG. 3A. Although the source is not shown, an analog communication signal is received by a reception amplifier. An analog to digital converter changes the received analog signal into a digital signal that is provided to block 310B where a class processor performs channel interface processing. From block 310B, the signal is provided to block 308B where a class processor performs demodulation. Moving from block 308B, the signal is provided to block 306B where a class processor performs channel decoding. From block 306B, the signal is moved to block 304B where decryption is performed. The signal is moved from block 304B to block 302B where a class processor performs source decoding. Next, the processed signal is provided to a host processor (not shown) in a format that enables the operation of the communication system by a user.

FIG. 4 illustrates a functional block overview 400 of at least some of the components included in a Class processor. Various application oriented class processors can be implemented by specifying different arithmetic methods. Other embodiments of class processors have either the same base architecture represented in FIG. 4 or a different base architecture. However, all class processors on any integration platform preferably have substantially the same base architecture.

Each of the class processor components is in communication with at least one of the other components. The Class processor includes public memory 402, protected memory 406, private memory 408, clock 410 and configurable core 404. As shown by the dotted double end arrow, public memory 402 is in communication with a control component (not shown) for the class processor.

Also, as shown by the solid double end arrow, protected memory 406 is in communication with a bus (not shown) where the processed signal is moved between the class processors in the data flow. Core 404 can be configured to operate with any one of a variety of different applications, such as a wireless communication standard. The configuration of core 404 can be selected during manufacture or performed at a later date, either manually or automatically based on a particular communication standard. Additionally, core 404 may have a portion that is hard wired to perform particular types of computations and another portion that is configurable to enable the hard wired portion of the core to operate with different applications, such as communication standards and the like.

As shown by the thick curved arrow, private memory 408 is employed by core 404 to perform computationally intensive calculations within the class processor. Additionally, to facilitate optimal operation and conservation of power by the class processor, the voltage level and clock signal for private memory 408 and configurable core may be substantially different than those voltage levels and/or clock signals employed with the operation of public memory 402 and protected memory 406. For example, the clock signal employed by core 404 and/or private memory 408 might be established substantially faster than those clock signals employed by public memory 402 and protected memory 406. Similarly, the voltage levels employed by core 404 and private memory 408 might be set substantially higher to enable even faster computations.

Figure 5:
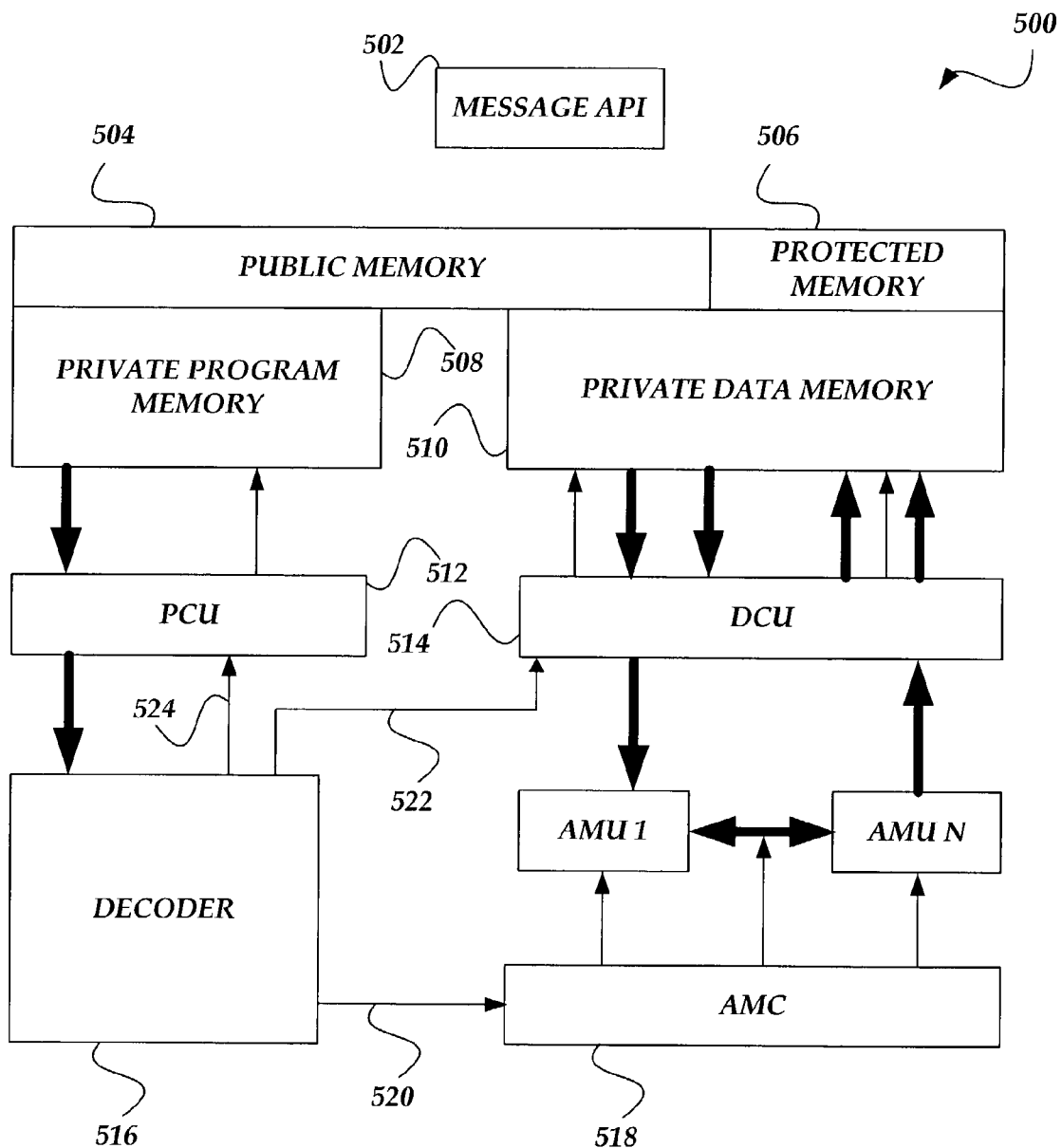
FIG. 5 shows a functional block diagram of at least some of the resources included in a class DSP.

FIG. 5 illustrates an architectural overview 500 of the components included in at least one embodiment of a class processor. These components include decoder 516 for translating different types of instruction code, e.g., Reduced Instruction Set Computer (RISC) instructions, Complex Instruction Set Computer (CISC) instructions, JAVA instructions, and the like, to control signals 520, 522, and 524 and Program Communications Unit (PCU) 512. The PCU provides sequence control and program address generation, and also enables the transfer of instructions from private program memory 508 to decoder 516. Although not shown, PCU 512 is controlled by a Program Communication Controller (PCC) which includes registers to direct program sequence according to instructions, e.g., looping, branching, breakpoint, trap and reset instructions. Data Communications Unit (DCU) 514 loads and/or stores data between private data memory 510 and registers (not shown). DCU 514 also performs a Data Address Generation (DAG) function, and controls addressing modes and pointer modifications. In the embodiment illustrated in FIG. 5, a set of data registers may be employed by DCU 514 for arithmetic and communication storage.

DCU 514 is controlled by a Data Communication Controller (DCC) that is loaded by decoder 516 and not shown in FIG. 5. In handling an instruction set, DCU 514 can form the operand and performs operand selection functions. An Arithmetic Method Control (AMC) 518 can control arithmetic operations performed by arithmetic method units (AMUs) for mathematical and logical operations, including, but not limited to, addition, subtraction, multiplication, AND, OR, XOR, and shifting. The AMUs (one through N) can also be employed for accuracy control such as saturation and rounding.

In some, but not all embodiments of a class processor, at least one AMU is included. In those embodiments where more than one AMU is included, the AMUs may be coupled in parallel or cascaded. Also, in some, but not all of the embodiments of a class processor, memory is included. Where memory is included in the class processor, the memory will include at least one of public memory 504, private memories 508 and 510, and protected memory 506. Public memory 504 is used for communication to a central host processor (not shown).

Additionally, private memories 508 and 510 are typically reserved for use by the class processor only and are usually not directly accessible by other class processors or the host processor. Protected memory 506 is provided for peer-to-peer data storage and communication, i.e., moving processed signals between selected class processors. Suitable memory types include, but are not limited to, RAM, ROM, Dynamic Random Access Memory (DRAM), and Embedded DRAM (EDRAM). The type of memory employed with a particular memory in the class processor is selected in view of functional and environmental requirements.

Decoder 516 transforms instructions/code in registers with decoding logic to generate control signals 520, 522 and 524. Decoder 516 can include an intrinsic function library (not shown) that stores pre-decoded instructions for fast, single-cycle execution of complicated arithmetic methods. The function library may be modified by decoder 516, run-time configured, or both.

Figure 6:
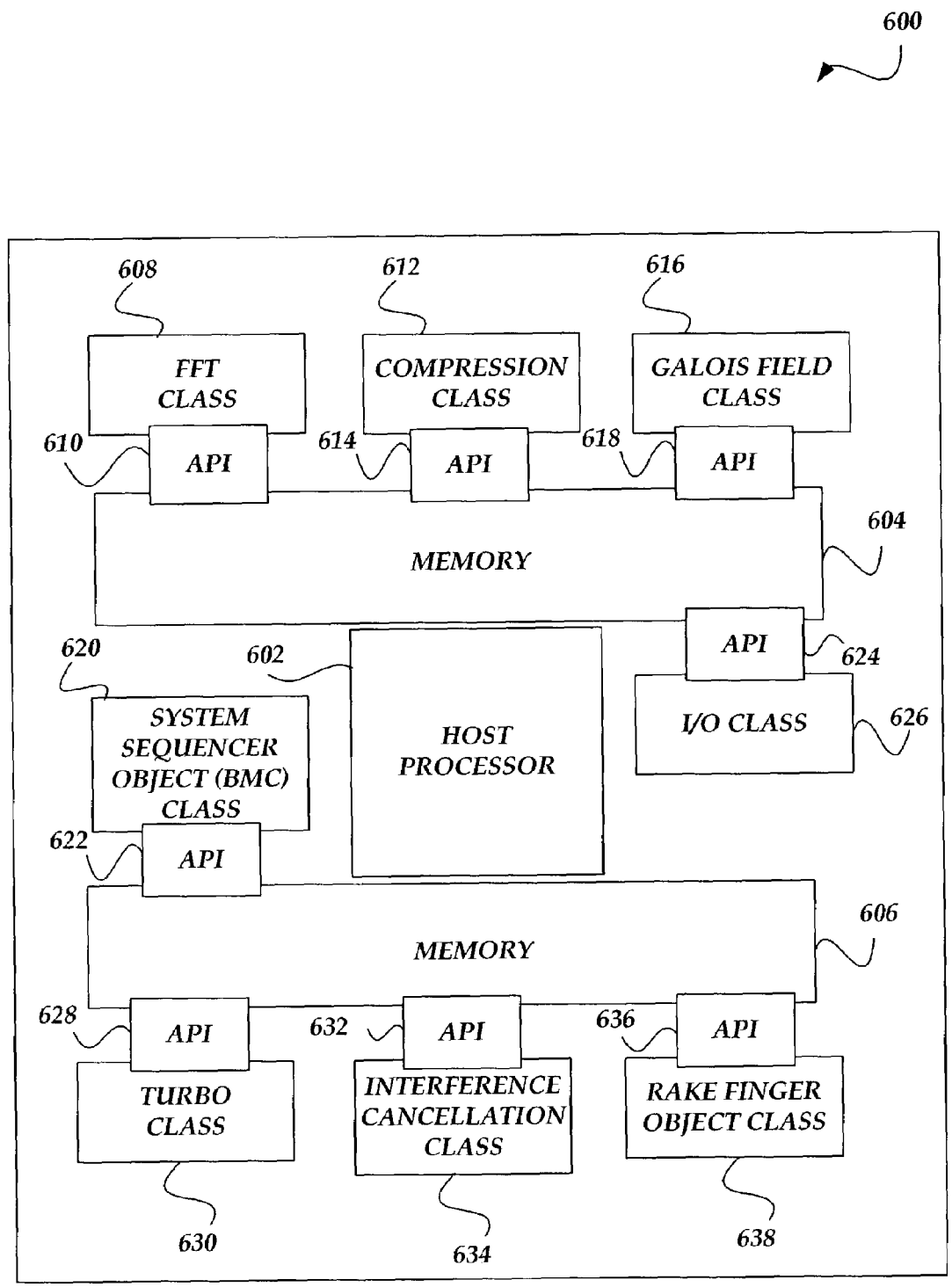
FIG. 6 illustrates a functional block diagram of at least some of the resources included in a communication signal processor.

FIG. 6 illustrates a functional block overview 600 of the components included in an exemplary CSP. The exemplary CSP includes a host processor that is coupled to memories 604 and 606. As shown, the CSP includes several class processors that are coupled by individual Application Programming Interfaces (API) to memories 604 and 606. The class processors and APIs included with the exemplary CSP are as follows: Class processor 608 for performing Fast Fourier Transform (FFT) methods and is coupled by API 610 to memory 604; Class processor 612 for performing compression/decompression methods and is coupled by API 612 to memory 604; Class processor 616 for performing Galois Field methods and is coupled by API 618 to memory 604; Class processor 620 for performing system sequencer methods and is coupled by API 622 to memory 606; Class processor 626 for performing input/output methods and is coupled by API 624 to memory 604; Class processor 630 for performing Turbo decoder methods and is coupled by API 628 to memory 606; Class processor 634 for performing interference cancellation methods and is coupled by API 632 to memory 606; and Class processor 638 for performing RAKE receiver methods and is coupled by API 636 to memory 606.

Although the embodiment of a CSP shown in FIG. 6 includes eight class processors and their respective APIs, it is understood that other embodiments of a CSP may include more or less class processors and/or APIs. Also, the separate APIs enable each class processor to be individually configured so that that the CSP can operate with different types of applications, such as wireless communication standards.

Figure 7:
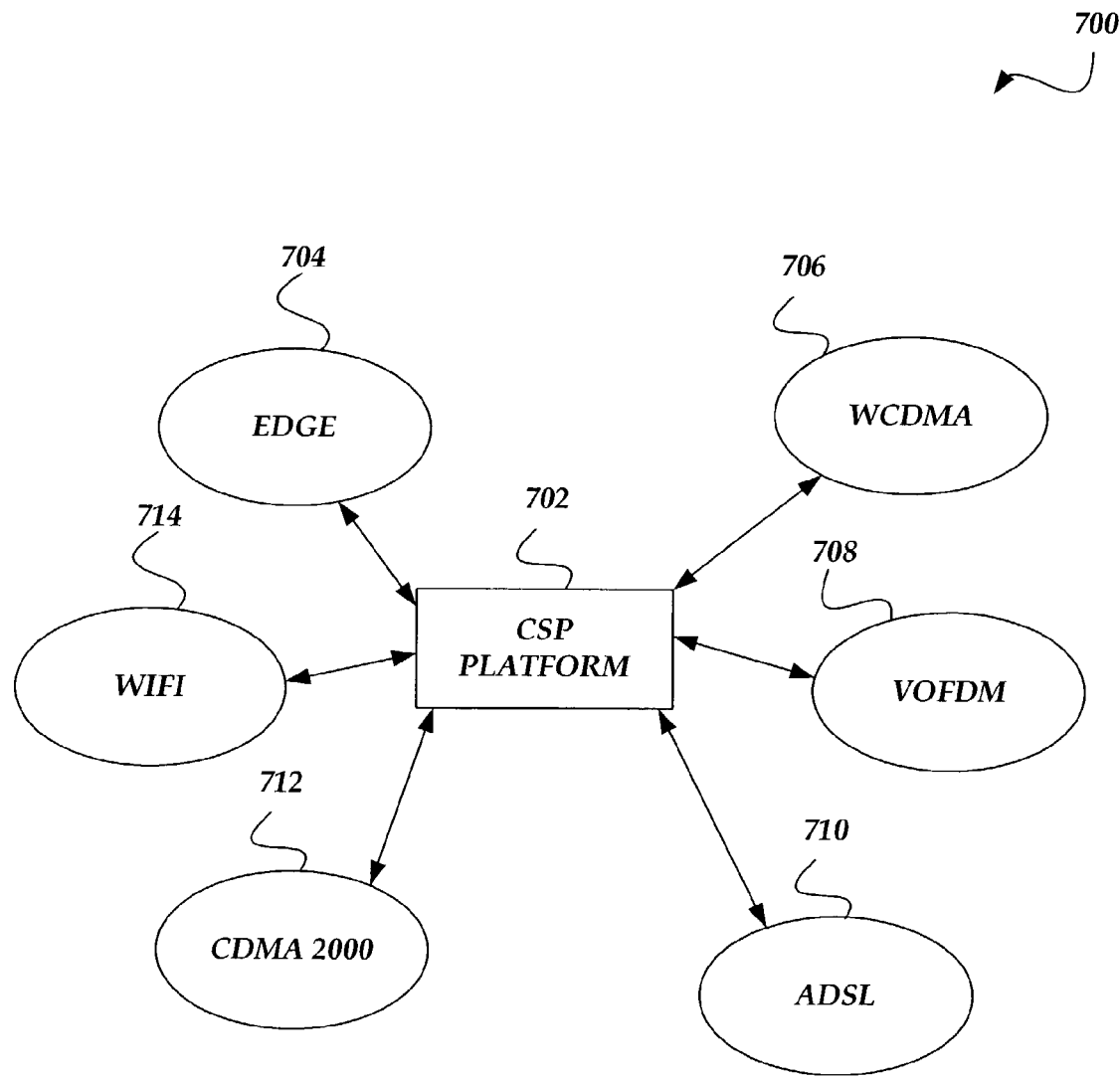
FIG. 7 shows a functional block diagram of various wireless communication standards supported by a communication signal processor platform.

FIG. 7 illustrates an overview 700 of the architecture for CSP platform 702 to support several different applications. These applications can include, but are not limited to, wireless communication standards, such as EDGE 704, WCDMA 706, Vector Orthogonal Frequency Division Multiplexing (VOFDM) 708, Asynchronous Digital Subscriber Line (ADSL) 710, CDMA 2000 712, WIFI (802.11 xx), and the like. It is understood that the CSP platform is intended to be flexible enough to benefit from and support a wide variety of applications that have deterministic data flows, such as wired and wireless communication standards.

WCDMA Embodiment

A Wideband CDMA (WCDMA) modem is one example of a highly flexible yet complex wireless system. WCDMA supports asynchronous operation of base station networks, therefore, a three-stage synchronization scheme is typically employed.

For a WCDMA receiver, synchronization or cell search procedure searches are complicated by the presence of multipath, soft/softer hand-off, frequency offset, antenna diversity and other impairments to both the channel and the receiver. To overcome these issues, the received signal is typically oversampled to ensure a proper Nyquist rate and improve timing. Also, this "frontend" processing usually occurs at some multiple of the clock rate for the receiver. Additionally, since this type of frontend processing is computationally intensive, special ASICs are often employed for this purpose.

However, ASICs are not known for their flexibility, which is an important feature for frontend components capable of accommodating changes and improvements. The invention partitions the hardware and DSP implementation of frontend processing to enable both power efficiency and flexibility. In addition to frontend processing provided by a Rake receiver, which despreads the chip rate sample and combines them, at least part of a cell search procedure is not limited to the initial acquisition of a signal. Rather, during the target mode, a WCDMA receiver can frequently search for a multi-path profile for finger assignment and received signals from neighboring base stations/sectors for soft/softer handoff.

The invention's flexible and efficient design can employ variable rate matching and multiple coding structures for different data rates and quality of services to optimize the memory usage and partitioning of tasks between DSP software modules and ASIC, accelerator and/or coprocessor hardware. Also, introduction of new decoding techniques are possible because of a reasonable level of programmability enabled by the invention.

A WCDMA system provides relatively fast power control for uplink and downlink. An uplink closed loop power control is employed to reduce the near-far problem, which can improve network capacity. Also, a downlink closed loop power control is employed to provide marginal additional power to a mobile node at the edge of a cell or a mobile node subject to a high level of fading.

Figure 8:
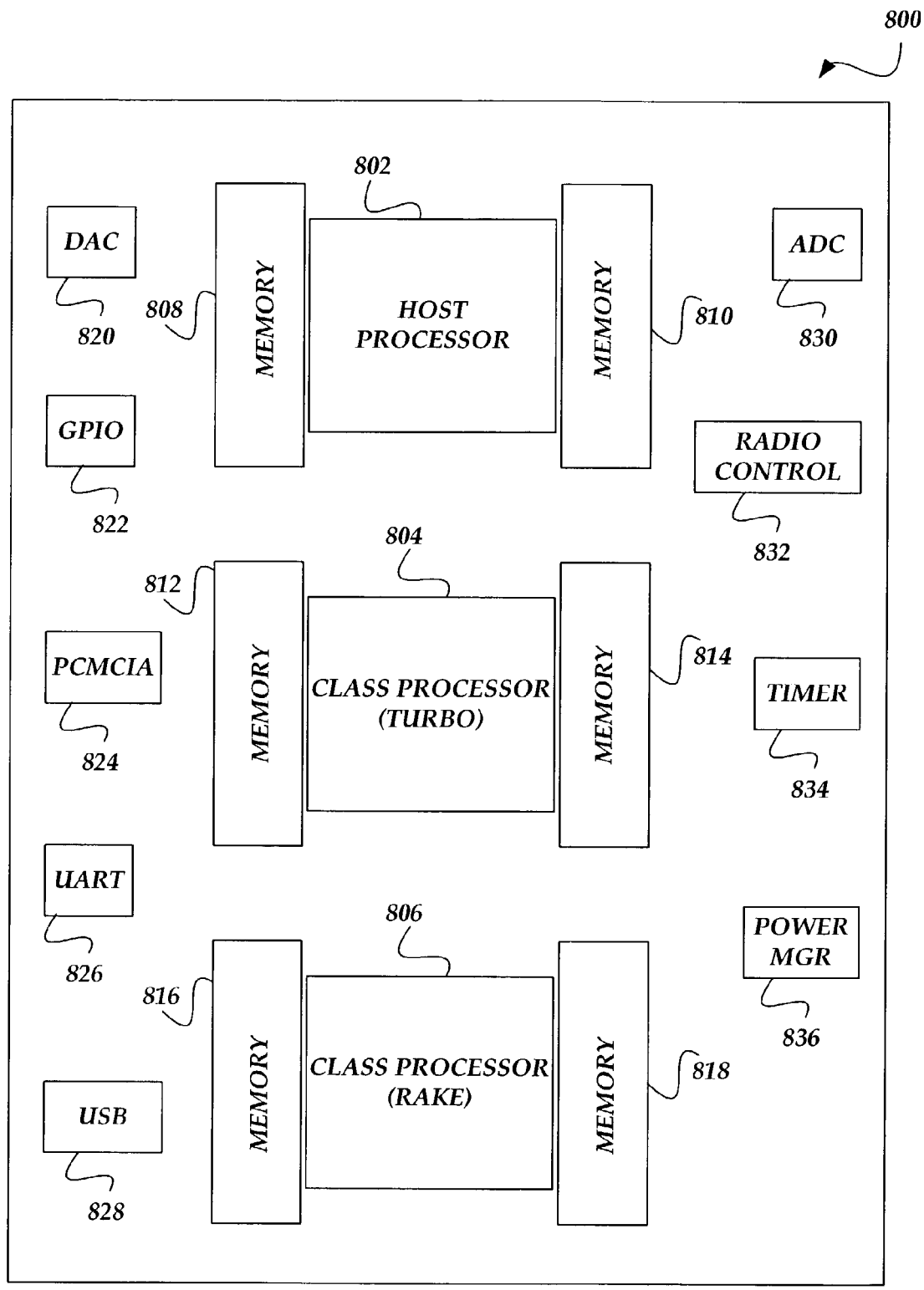
FIG. 8 illustrates a functional block diagram of at least some of the resources included in one implementation of a mobile node.

FIG. 8 illustrates an overview of an exemplary System on a Chip WCDMA modem 800 that employs a CSP platform with two class processors that support two different types of methods, i.e., class processor 804 operates as a RAKE receiver and class processor 806 operates as a Turbo decoder. The exemplary WCDMA modem includes Digital to Analog Converter (DAC) 820, Analog to Digital Converter (ADC) 830, Radio Control 832, Timer 834, Power Manager 836, Universal Serial Bus interface (USB) 828, Universal Asynchronous Receiver Transmitter (UART) 826, Personal Computer Memory Card International Association interface (PCMCIA) 824, and General Purpose Input Output interface (GPIO). Memories 808 and 810 are coupled to Host Processor 802, and memories 812 and 814 are coupled to Class Processor (Turbo) 804. Also, Class Processor (RAKE) 806 is coupled to memories 716 and 818. Further, each of the memories may be accessed by Host Processor 802, Class Processor 804, and Class Processor 806.

Methods For Processing Signals

Figure 9:
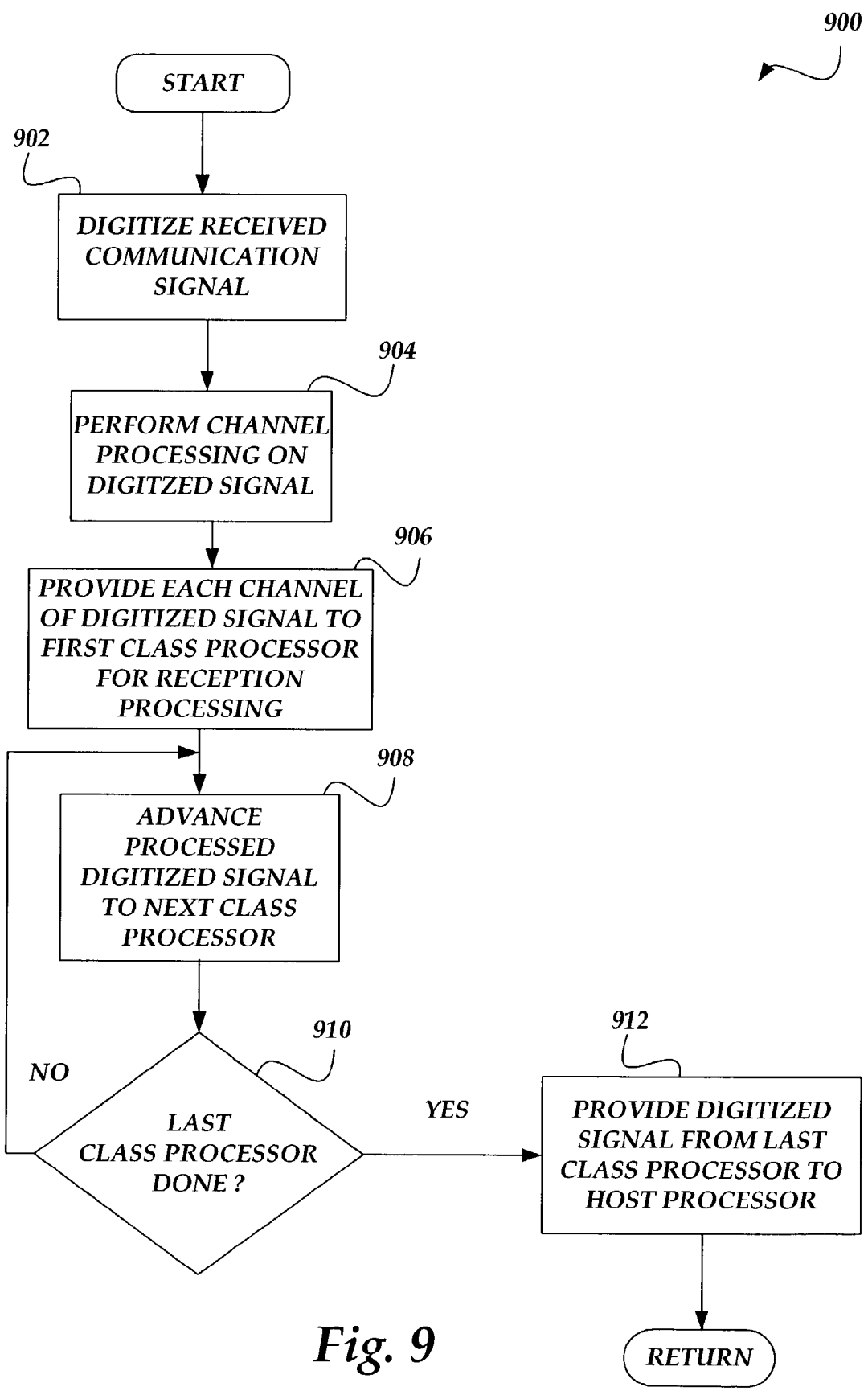
FIG. 9 shows a flow diagram for receiving wireless communication signals.

FIG. 9 is a flow chart of an overview 900 for processing a received communication signal with the inventive CSP platform. Moving from a start block, the process advances to a block 902 where a received analog communication signal is digitized. At block 904, the process performs channel processing on the digitized communication signal. Flowing to block 906, the process determines the deterministic data flow for processing the digitized communication signal and provides the signal to the first class processor to begin performing an algorithm to process the signal. Next, the process steps to block 908 where the next class processor begins performing an algorithm to process the signal.

Next, the process moves to decision block 910 where a determination is made as to whether the last class processor has performed its algorithm on the signal. If false, the process loops back to block 908 and performs substantially the same operations described above. However, if the determination at decision block 910 is positive, the process moves to block 912 where the processed signal is provided to the host processor in a format that is now suitable for further processing by other components included with the communication system. Next, the process returns to performing other actions.

Figure 10:
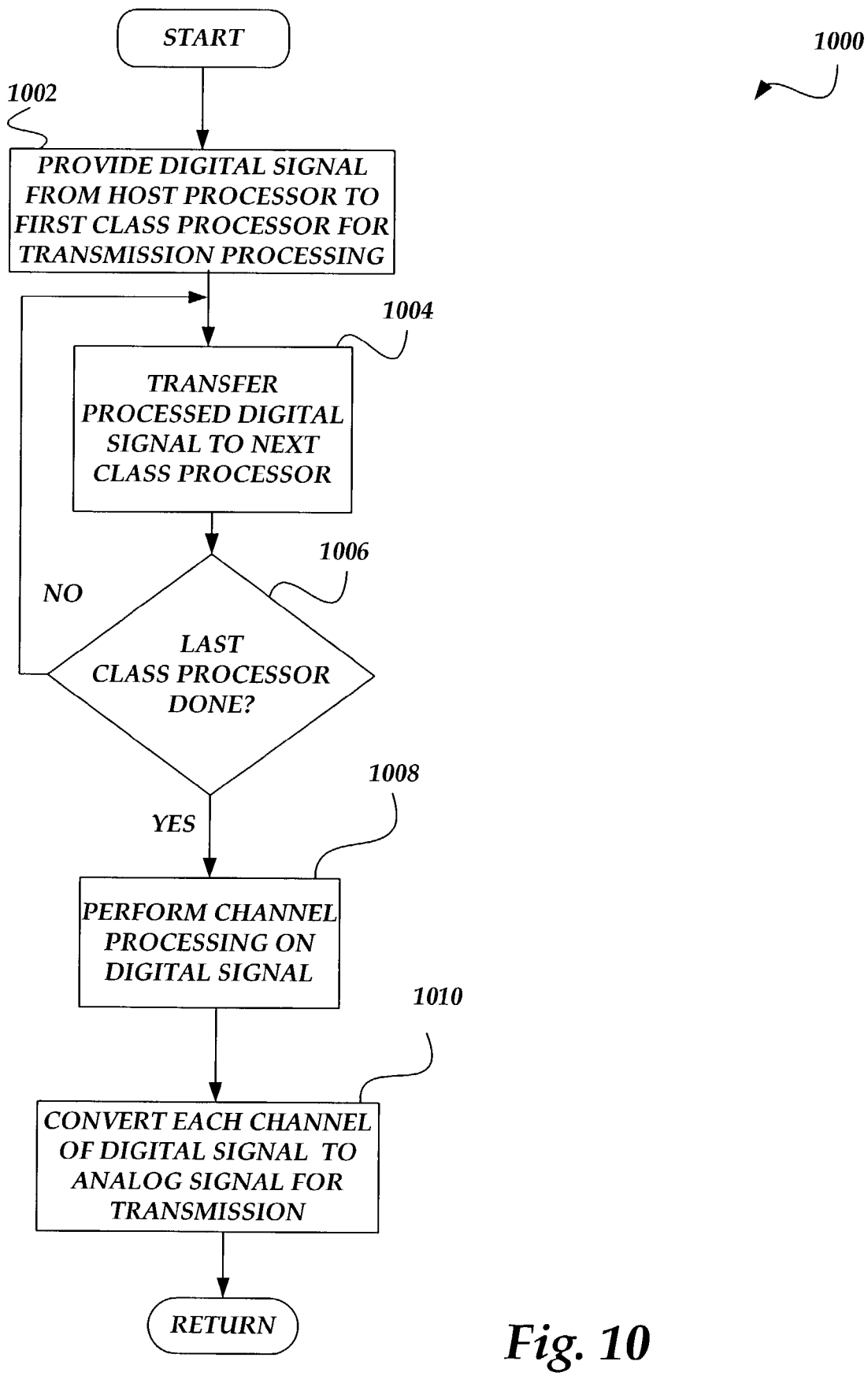
FIG. 10 illustrates a flow diagram for transmitting wireless communication signals.

FIG. 10 is a flow chart of an overview 1000 for processing the transmission of a communication signal. Moving from a start block, the process advances to block 1002 where a digital signal from a host processor is provided to a first class processor to perform its algorithm on the signal. The process moves to block 1004 where the digital signal is provided to the next class processor, which performs its algorithm on the signal. At block 1006, a determination is made as to whether or not the last class processor has performed its algorithm on the digital signal. If not, the process loops back to block 1004 where the processing of the digital signal by another class processor is performed.

However, if the determination at decision block 1006 is true, the process moves to block 1008 where channel processing is performed on the digital signal. At block 1010, the process converts each channel of digital signal into an analog signal and provides this analog signal for an amplifier for transmission to a node. Next, the process returns to processing other actions.

Figure 11:
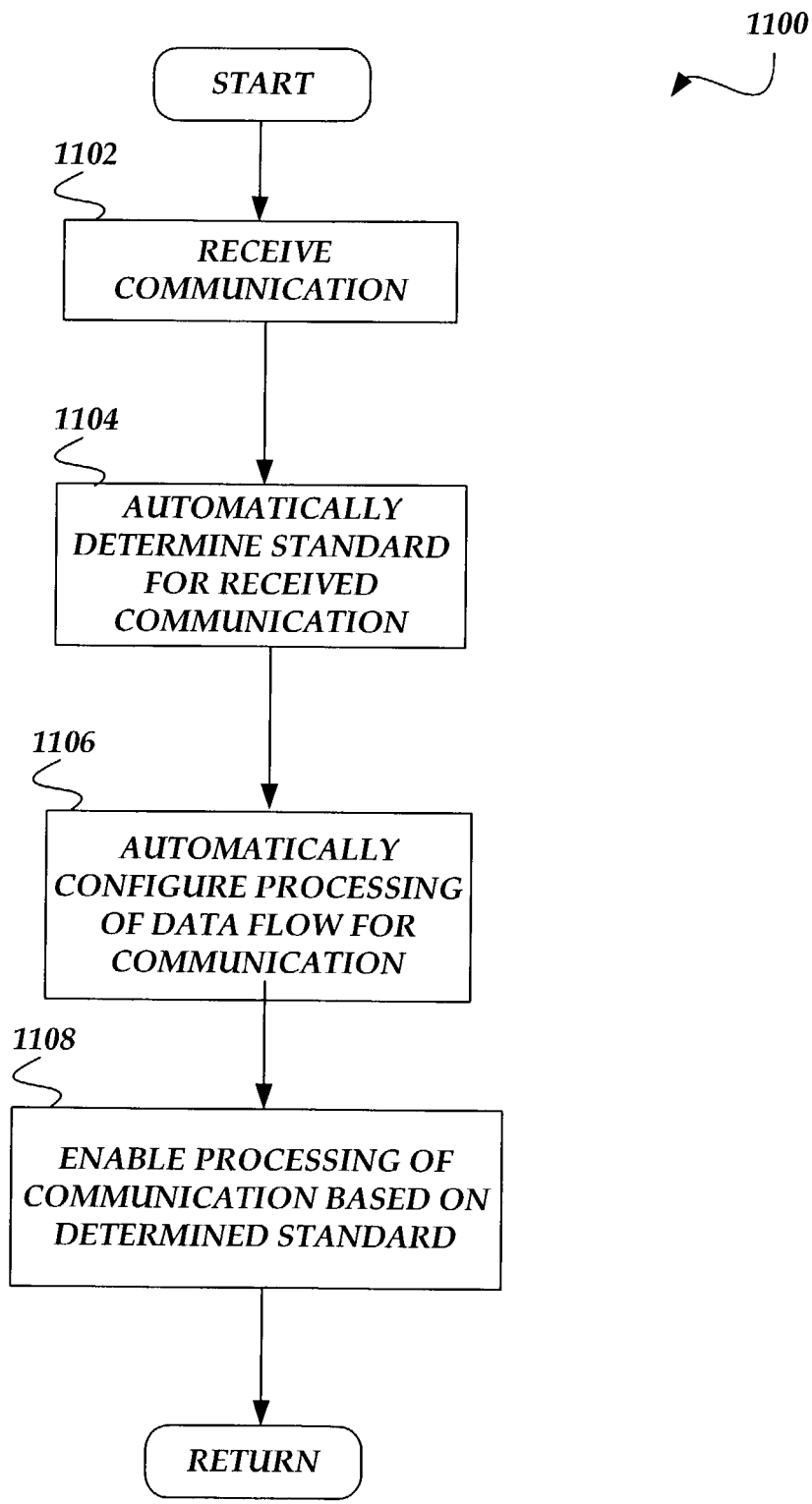
FIG. 11 shows a flow diagram for automatically configuring the operation of a communication signal processor based on a protocol associated with a received wireless communication signal.

FIG. 11 is a flow chart of an overview 1100 for automatically configuring the operation of the invention to work with a communication standard or protocol. Moving from a start block, the process steps to block 1102 where communication signal is received. At block 1104, the process automatically determines the standard associated with the received communication signal. In one embodiment, at least one characteristic of the received communication signal is compared to a list or table to determine the communication standard, e.g., CDMA, TDMA, GSM, WIFI, WCDMA, CDMA 2000, GPRS, and the like. In another embodiment, information included with the received communication signal is employed to determine the communication standard.

At block 1106, the process automatically configures the operation of each class processor in a CSP platform to process a deterministic flow of data associated with received and transmitted communication signals in accordance with the determined communication standard. Flowing to block 1108 the process enables the CSP platform to process received and transmitted communication signals in accordance with the determined communication standard. Next, the process returns to processing other actions.

Figure 12:
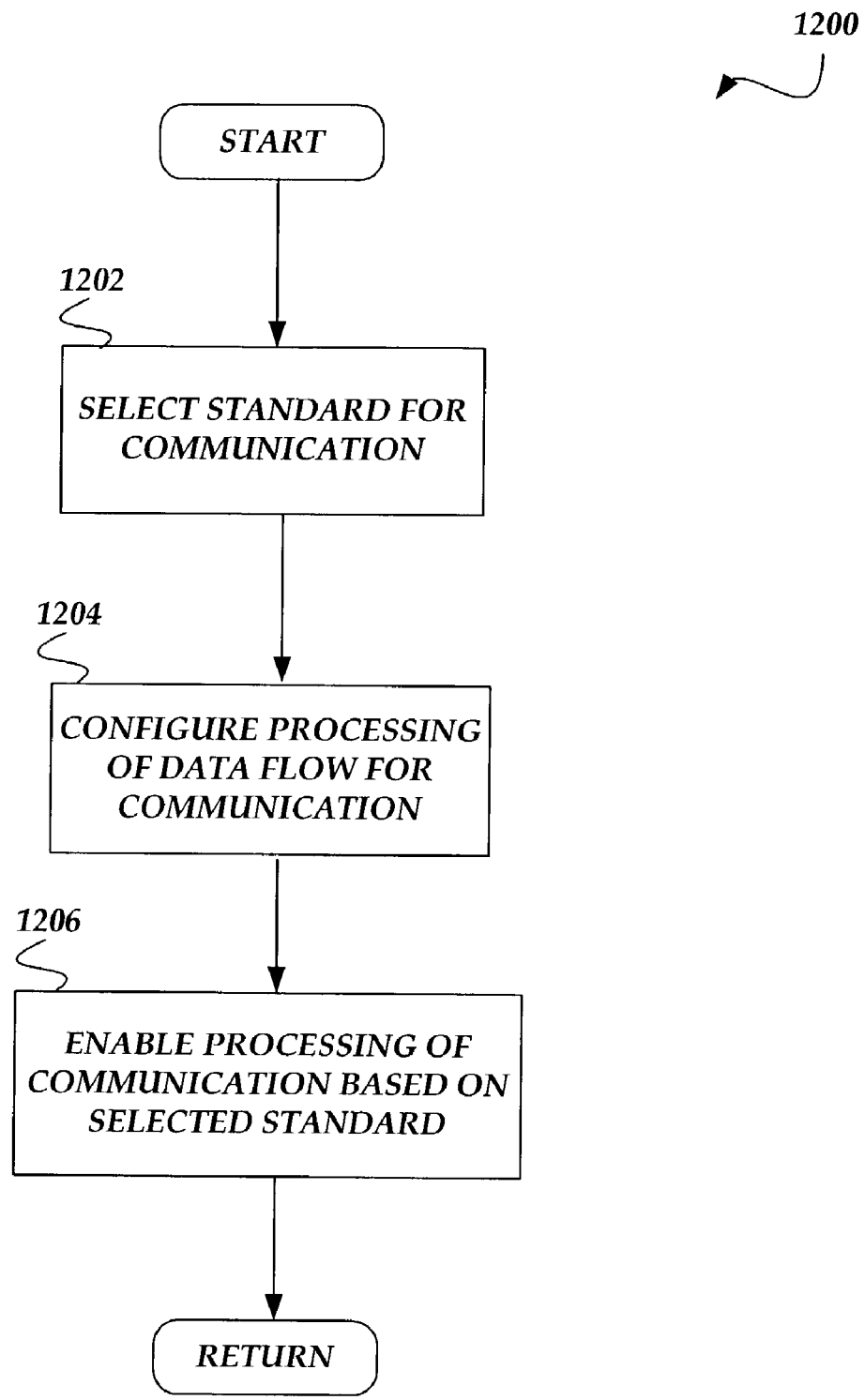
FIG. 12 illustrates a flow diagram for configuring the operation of a communication signal processor based on a selected protocol, in accordance with the present invention.

FIG. 12 is a flow chart of an overview 1200 for enabling the selection of a particular communication standard to be employed with the processing of received and transmitted communication signals. Moving from a start block, the process steps to block 1202 where the communication standard is selected. At block 1204, the class processors in a CSP platform are configured to process a deterministic data flow associated with received and transmitted communication signals in accordance with the selected communication standard. Next, the process moves to block 1206 where the process enables the CSP platform to process received and transmitted communication signals in accordance with the selected communication standard.

The above specification, examples and data provide a complete description of the manufacture and use of the invention. Since many embodiments of the invention can be made without departing from the spirit and scope of the invention, the invention resides in the claims hereinafter appended.

We claim:

1. An apparatus for signal processing, comprising:
   (a) a component that enables communication of a received signal and a transmitted signal with a node;
   (b) a plurality of class processors for processing a data flow associated with the transmitted signal and another data flow associated with the received signal, wherein at least one of the class processors is configured for processing a portion of at least one of the data flows associated with the transmitted signal and the received signal, and wherein at least one of the class processors is configurable to perform the processing of the portion of the data flows at a different speed than at least one of the other class processors that is configurable to perform processing of another portion of the data flows; and
   (c) a host processor that is in communication with the plurality of class processors, wherein the other data flow associated with the received signal is provided to the host processor after processing by at least one of the plurality of class processors, and wherein the data flow associated with the transmitted signal is provided by the host processor to the plurality of class processors for processing and communication of the transmitted signal to the node.

2. The apparatus of claim 1, wherein at least one of the data flow associated with the transmitted signal and the other data flow associated with the received signal are-deterministic.

3. The apparatus of claim 1, wherein at least one of the plurality of class processors includes at least a hard wired component that is selectively configurable for processing the portion of at least one of the data flows associated with the transmitted signal and the received signal.

4. The apparatus of claim 1, wherein at least one of the plurality of class processors further includes at least a firmware component that is selectively configurable for processing the portion of at least one of the data flows associated with the transmitted signal and the received signal.

5. The apparatus of claim 1, further comprises an API for configuring the operation of at least one of the plurality of class processors.

6. The apparatus of claim 5, wherein the API further comprises an interface that is substantially similar to at least one other API for configuring the operation of at least one other class processor.

7. The apparatus of claim 1, wherein the plurality of class processors further comprises at least one class processor that is separately configurable to perform a category of processing on the data flow associated with the transmitted signal and the received signal, at least one of the categories of processing includes: bit manipulation, rake receiver, galois field, convolutional coding, adaptive algorithm and vector processing.

8. The apparatus of claim 1, wherein the plurality of class processors fiber comprises at least one class processor separately configurable to perform at least one type of action to process the other data flow associated with the received signal, at least one of the types of action including rake finger, channel interface, demodulation, channel decoding, decryption, and source decoding.

9. The apparatus of claim 1, wherein the plurality of class processors further comprises at least one class processor separately configurable to perform at least one type of operation to process the data flow associated with the transmitted signal, at least one of the types of operation including channel interface, modulation, channel coding, encryption, and source coding.

10. The apparatus of claim 1, wherein at least one of the plurality of class processors is separately configurable during the process of manufacture to operate in accordance with a wireless communication standard.

11. The apparatus of claim 1, wherein at least one of the plurality of class processors is separately configurable to operate with a wireless communication standard during integration with a mobile node.

12. The apparatus of claim 1, wherein at least one of the plurality of class processors is automatically configurable for operation with a mobile node in accordance with a determined wireless communication standard.

13. The apparatus of claim 1, further comprising a separate clock signal for each class processor, wherein each clock signal enables the asynchronous clocking of the operation of each class processor to process its portion of at least one of the data flows associated with the transmitted signal and the received signal.

14. The apparatus of claim 1, further comprising a private memory for each class processor, wherein each private memory is employed by each class processor to enable the performance of at least one action on its portion of at least one of the data flows associated with the transmitted signal and the received signal.

15. The apparatus of claim 1, further comprising a protected memory for each class processor, wherein each protected memory is employed by each class processor to transfer processed data flows associated with the transmitted, signal and the received signal to at least one other class processor.

16. The apparatus of claim 1, further comprising a public memory for each class processor, wherein each public memory is employed by the host processor to communicate with each class processor.

17. The apparatus of claim 1, further comprising a selective configuration of the plurality of class processors to enable the operation of a modem in accordance with a wireless communication standard.

18. The apparatus of claim 17, wherein the wireless communication standard includes at least one of CDMA, TDMA, GSM, EDGE, WCDMA, WIFI, iDEN, CDMA 2000, GPRS, and Bluetooth.

19. An apparatus for signal processing, comprising:
(a) a component for enabling communication of a received signal and a transmitted signal with a node;
(b) a converter that is configured to convert the received signal into a data flow and is further configured to convert another data flow into the transmitted signal;
(c) a plurality of class processors that are configured for processing the data flow associated with the transmitted signal and the other data flow associated with the received signal, wherein at least one of the class processors is separately configurable for processing a particular portion of at least one of the data flows, and wherein at least one of the class processors is configurable to perform the processing of the particular portion of the data flows at a different speed than at least one of the other class processors that is configurable to perform the processing of another portion of the data flows; and
(d) a host processor that is in communication with at least the plurality of class processors, wherein the other data flow associated with the received signal is provided to the host processor after processing by the plurality of class processors, and wherein the data flow associated with the transmitted signal is provided by the host processor to the plurality of class processors for processing and conversion by the converter into the transmitted signal that is communicated by the transceiver to the node.

20. The apparatus of claim 19, wherein the component further comprises at least one of a receiving amplifier for receiving the received signal and a transmitting-amplifier for transmitting the transmitted signal.

21. The apparatus of claim 19, wherein the converter includes at least one of a digital-to-analog converter and an analog-to-digital converter.

22. A modem for signal processing with a wireless communication standard, comprising:
(a) a component for communicating a received signal and a transmitted signal with a node;
(b) a plurality of class processors that are configured for processing the transmitted signal and the received signal, wherein at least one class processor is separately configured for processing a portion of at least one of the transmitted signal and the received signal, and wherein at least one of the class processors is configurable to perform the processing of the portion of at least one of the transmitted and received signals at a different speed than at least one of the other class processors that is configurable to perform the processing of another portion of at least one of the transmitted and received signals; and
(c) a host processor that is in communication with the plurality of class processors, wherein the received signal is provided to the host processor after processing by the plurality of class processors, and wherein the transmitted signal is provided by the host processor to the plurality of class processors for processing and communication to the node.

23. The modem of claim 22, wherein the wireless communication standard includes one of CDMA, TDMA, GSM, EDGE, WCDMA, WIFI, iDEN, CDMA 2000, GPRS, and Bluetooth.

24. The modem of claim 22, wherein the plurality of class processors further comprises at least one class processor separately configurable to perform at least one type of action to process the received signal, at least one of the types of action include rake finger, channel interface, demodulation, channel decoding, decryption, and source decoding.

25. The modem of claim 22, wherein the plurality of class processors further comprises at least one class processor separately configurable to perform at least one type of operation to process the transmitted signal, at least one of the types of operation include rake finger, channel interface, modulation, channel coding, encryption, and source coding.

26. An apparatus for signal processing, comprising:
(a) means for communicating a received signal and a transmitted signal with the node;
(b) means for converting the received signal into a data flow and another means for converting another data flow into the transmitted signal;
(c) means for employing a plurality of class processors to process the data flow associated with the transmitted signal and the other data flow associated with the received signal, wherein at least one of the class processors is separately configurable for processing a portion of at least one of the data flow and the other data flow, and wherein at least one of the class processors is configurable to perform processing of the portion of the data flows at a different speed than at least one of the other class processors that performs processing of another portion of the data flows; and
(d) means for enabling a host processor to be in communication with the plurality of class processors, wherein the other data flow associated with the received signal is provided to the host processor for further actions after processing by at least one of the plurality of class processors, and wherein the data flow associated with the transmitted signal is provided by the host processor to the plurality of class processors for processing, and wherein the subsequently processed data flow is converted into the transmitted signal for communication to the node in accordance with the wireless communication standard.

27. A method for processing data signals, comprising:
(a) receiving a signal from a node and providing a data flow associated with the received signal to a plurality of class processors for processing, wherein at least one class processor is separately configurable for processing at least a portion of the signal, and wherein at least one of the class processors is configurable to perform the processing of the portion of the data flow at a different speed than at least one of the other class processors that is configurable to perform processing of another portion of the data flow;
(b) enabling a host processor to receive the processed data flow and enabling the host processor to perform an action based on the content of the processed data flow;
(c) enabling the plurality of class processors to process another data flow that is provided by the host processor to the plurality of class processors for processing; and
(d) transmitting another signal to the node, wherein the generation of the other signal is based on the processed other data flow.

28. The method of claim 27, further comprising:
(a) converting the received signal into the data flow that is provided to the plurality of class processors; and
(b) converting the processed other data flow into the transmitted signal.

29. The method of claim 27, further comprising enabling separate clocking of at least one class processor to process its portion of at least one of the data flows associated with the transmitted signal and the received signal, wherein the separate clocking enables asynchronous processing of the data flows associated with the transmitted signal and the received signal.

30. The method of claim 29, wherein the separate clocking is configurable to enable the saving of power in the asynchronous processing of the data flows associated with the transmitted signal and the received signal.

31. The method of claim 29, wherein the separate clocking is configurable to enable reduction in a delay in the asynchronous processing of the data flows associated with the transmitted signal and the received signal.

* * * * *

UNITED STATES PATENT AND TRADEMARK OFFICE
CERTIFICATE OF CORRECTION

PATENT NO. : 7,016,695 B1  Page 1 of 1
APPLICATION NO. : 10/318346
DATED : March 21, 2006
INVENTOR(S) : Ahmad Bahal It is certified that error appears in the above-identified patent and that said Letters Patent is hereby corrected as shown below:

In the Specification:

Column 2, Line 48, Delete "EMBODIMENT" and insert -- EMBODIMENTS --.

Column 14, Line 15-16, In Claim 2, delete "are-deterministic." and insert -- are deterministic. --.

In the Claims:

Column 14, Line 45 (Approx.), In claim 8, delete "fiber" and insert -- further --.

Signed and Sealed this

Twenty-fifth Day of July, 2006

JON W. DUDAS
*Director of the United States Patent and Trademark Office*